Feb. 16, 1932.  N. B. GREEN  1,846,004
MOTION PICTURE PROJECTOR
Filed June 21, 1927
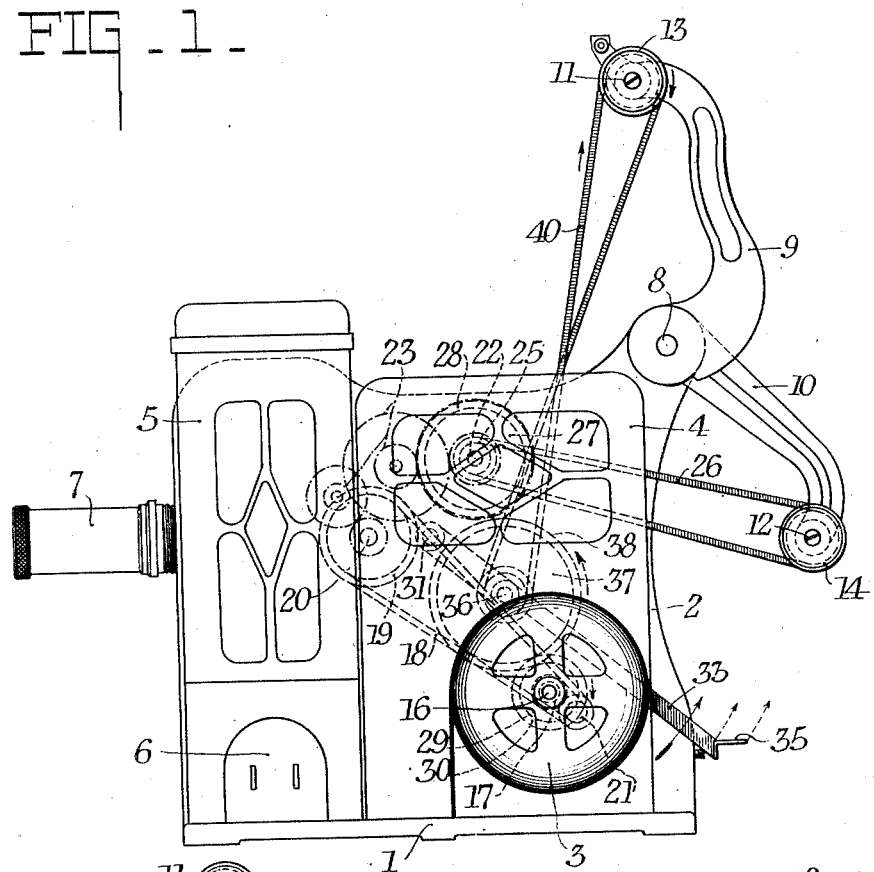
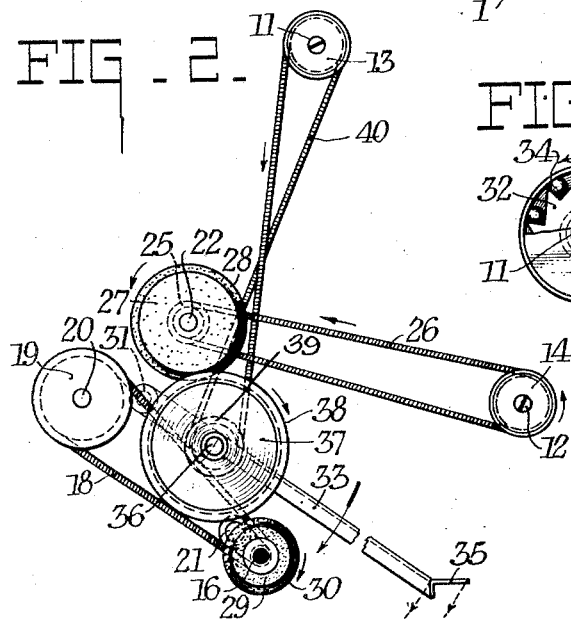
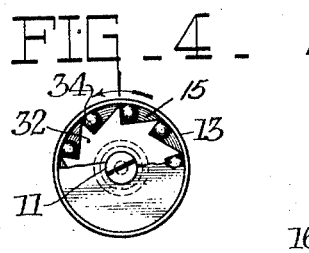
INVENTOR,
Newton B. Green
BY
ATTORNEYS.

Patented Feb. 16, 1932

1,846,004

UNITED STATES PATENT OFFICE

NEWTON B. GREEN, OF ROCHESTER, NEW YORK, ASSIGNOR TO EASTMAN KODAK COMPANY, OF ROCHESTER, NEW YORK, A CORPORATION OF NEW YORK

MOTION PICTURE PROJECTOR

Application filed June 21, 1927. Serial No. 200,449.

This invention relates to motion picture projectors and particularly to mechanisms permitting the rapid rewinding of an exhibited film. More specifically this invention is a simplification of and a particular embodiment of certain aspects of the invention claimed generically in the copending application of Howard C. Wellman, Serial No. 200,454, filed June 21, 1927.

The objects of the invention are to provide such a mechanism that is easy to operate, simple in structure, inexpensive, and that is operative for rewinding only when purposely manipulated, being otherwise automatically restored to a normal or projecting condition.

Other objects and advantages will appear from the following specification wherein reference is made to the accompanying drawings, in the various figures of which the same reference characters denote the same parts and in which, Fig. 1 is a side elevation of a projector embodying my invention;

Fig. 2 shows the rewind mechanism only;

Fig. 3 is an end view of certain parts of said mechanism;

Fig. 4 is a detail of a one-way clutch, a part being broken away and viewed from the rear of Fig. 1.

The projector comprises a support 1 carrying the usual necessary operating parts, most of which are not important to the present invention and are, therefore, omitted. It is of the general type fully disclosed in the patent of William A. Riddell, No. 1,716,463, granted June 11, 1929.

A frame 2 carries these parts, there being shown a motor 3, a housing 4 containing resistances or other parts, a lamphouse 5, with an electric connection 6, and an objective mount 7.

At the upper rear portion of frame 2 is pivoted at 8 two arms 9 and 10 carrying reel supporting shafts 11 and 12 respectively, these carrying friction pulleys 13 and 14 including one way clutches of the type shown in Fig. 4. Upon a shaft, as 11, is keyed a ratchet wheel 32 within the pulley drum 13. Balls 34 are mounted in the spaces 15 between the ratchet teeth and when the pulley is turned in the direction indicated in Fig. 4, the pulley runs freely but when turned in the reverse direction the balls bind in the spaces and drive the shaft. The particular type of clutch is immaterial, this being shown by way of example. The clutches for the two shafts are so arranged that they are alternatively operative.

The motor shaft 16 carries a friction pulley 17 for engagement with a coil spring belt 18 which drives a pulley 19 on shaft 20 and this drives the mechanism of the projector. This belt 18 may be disconnected from driving contact with pulley 17 by a roller 21 which may be swung from the position shown in Fig. 2 to that disclosed in Fig. 1 as is more fully described in the application of Otto Wittel, Serial No. 97,352, filed March 25, 1926.

Shaft 20 communicates motion to a shaft 22 through a train of gears indicated at 23. Shaft 22 carries a sprocket 24 which is a part of the film advancing mechanism and also a friction pulley 25 about which passes a coiled spring belt 26 which drives pulley 14 on the take-up reel shaft 12. On the same shaft 22 is a disc or pulley 27 with a frictional peripheral surface 28 such as rubber and in alignment therewith on shaft 16 is a similar disc 29 with a frictional peripheral surface 30.

Pivoted at 31 on frame 2 is a lever 33, the other end of which protrudes at the rear of the machine and is formed into a finger piece 35. This lever carries at an intermediate point of its length a stub shaft 36 carrying a disc 37 with a frictional peripheral groove 38 in alignment with discs 27 and 29. The stub shaft 36 also carries a friction pulley 39 about which and pulley 13 is passed a coil spring belt 40.

In the normal operation of the projector, the parts will be in the relation shown in Fig. 2. The motor shaft 16 will turn in the direction indicated and, through the described connections, will turn shaft 22 as indicated, thereby turning the sprocket and advancing film from the upper to the lower reel. Disc 37 and belt 40 move as indicated, turning pulley 13 in the direction indicated in Fig. 4, turning freely on the shaft, so that a supply reel on shaft 11, will deliver only such film as is drawn from it. Since the pulley 14 is connected to its shaft 12 by a one way clutch reversely arranged, this shaft and a take-up reel carried by it will be driven to wind up the projected film. The tension of belt 40 holds the lever 33 in its upper position and the discs 37 and 27 in contact. During this action the pulley 13, being driven as indicated in Fig. 2, turns idly. At any time during projection, the motor may be reversed and the film will pass through the projector in the reverse direction, being then wound on the upper reel. The parts then all move in the reverse directions to those indicated in Fig. 2 and pulley 14 turns idly.

After projection, the upper reel will ordinarily be empty and the lower one full. If not, they will be interchanged. The free film end is attached to the upper reel and handle 35 is depressed in the direction indicated by arrows in Fig. 2, moving the parts to the position of Fig. 1. Roller 21 is moved to the position of Fig. 1, disconnecting the projector mechanism from the motor. The motor, continuing to turn in the direction for normal projection, will cause disc 38, pulley 39 and belt 40 and pulley 13 to move in the directions indicated in Fig. 1. Since the speed of rotation of shaft 16 is very much greater than that of shaft 22 the film will be rewound on the upper reel at a high rate of speed.

At the conclusion of rewinding, the user releases the handle 35 which automatically moves in the direction indicated by the arrows in Fig. 1, restoring the parts to the normal operative position.

It is to be understood that the present structure is an example and that I consider as included within my invention all such modifications and equivalents as fall within the scope of the appended claims.

Having thus described my invention, what I claim as new and desire to secure by Letters Patent is:

1. In a motion picture apparatus, two reel supports, a power shaft, means for propelling a film through the apparatus, driving connections from the power shaft to both reel supports, the driven connections to one only of the reel supports including alternatively operative driving systems producing different speed ratios between the said driven reel support and the power shaft and means for reversing the direction of application of power from the power shaft to the reel supports.

2. In a motion picture apparatus, two reel supports, a power shaft, means for propelling a film through the apparatus, driving connections from the power shaft to both reel supports, the driving connections from the power shaft to one only of the reel supports including alternatively operative driving systems producing different speed ratios between the said driven reel support and the power shaft, one of said systems being normally and automatically operative and means for reversing the direction of application of power from the power shaft to the reel supports.

3. In a motion picture apparatus, two reel supports, a power shaft, means for propelling a film through the apparatus, driving connections from the power shaft to both reel supports, the driving connections from the power shaft to one only of the reel supports including alternatively operative driving systems producing different speed ratios between the said driven reel support and the power shaft, that system producing the lower speed in the driven shaft being normally and automatically operative and means for reversing the direction of application of power from the power shaft to the reel supports.

4. In a motion picture projector, two reel supports, a power shaft, means for advancing film through the projector, driving connections from the power shaft to the means and to both reel supports, the driving connections to the two reel supports including, respectively, alternatively operative power transmitting elements, the driving connections to one only of said reel supports including other alternatively operative driving systems producing different speed ratios between the said reel support and the power shaft and means for reversing the direction of application of power from the power shaft to the reel supports.

5. In a motion picture projector, two reel supports, means for advancing film through the projector, a power shaft, driving connections from the power shaft to the means and to both reel supports, whereby film may be advanced from a reel on either support through the projector to a reel on the other support, the driving connections to one only of said reel supports including alternatively operative driving systems producing different speed ratios between the said reel support and the power shaft and means for reversing the direction of application of power from the power shaft to the reel supports.

6. In a motion picture projector, two reel supports, means for advancing film through the projector, a power shaft and driving connections from the power shaft to the means and to both reel supports, whereby film may be advanced from a reel on either support through the projector to a reel on the other support, the driving connections to one only of said reel supports including alternatively operative driving systems producing different speed ratios between the said reel support and the power shaft, that system producing the lower speed in the reel support being normally and automatically operative.

7. In a motion picture projector, a supply reel shaft, a take-up reel shaft, a power shaft, driving connections from the power shaft to both the other shafts, the driving connections between the power shaft and the supply reel shaft including two fixed, driven, rotating members having different peripheral speeds, and a rotating member movable between two positions in which it alternatively engages one or the other of the said two members peripherally and is driven thereby.

8. In a motion picture projector, a supply reel shaft, a take-up reel shaft, a power shaft, driving conections from the power shaft to both the other shafts, the driving connections between the power shaft and the supply reel shaft including two fixed, driven, rotating members having different peripheral speeds, and rotating member movable between two positions in which it alternatively engages one or the other of the said two members peripherally and is driven thereby, said movable rotating member being normally spring pressed into contact with that fixed rotating member having the lower peripheral speed.

9. In a motion picture projector, a supply reel shaft, a take-up reel shaft, a power shaft, driving connections from the power shaft to both the other shafts, the driving connections between the power shaft and the supply reel shaft including two fixed, driven, rotating members having different peripheral speeds, a rotating member movable between two positions in which it alternatively engages one or the other of the said two members peripherally and is driven thereby, and including also a clutch operative to turn the supply reel shaft only when the movable rotating means turns in one direction.

10. In a motion picture apparatus, a power shaft, mechanism driven therefrom for propelling film through the apparatus, two reel supports, driving connections from said mechanism to both of said reel supports whereby the reel supports may be driven independently of the film, and means for breaking the said driving connections to one of said shafts and establishing alternative driving connections directly from said power shaft to said shaft.

11. In a motion picture apparatus, a power shaft, mechanism driven therefrom for propelling film through the apparatus, two reel supports, alternatively operable driving connections from said mechanism to both of said reel supports whereby the reel supports may be driven independently of the film, the driving connection to one reel support including a member movable between two positions, in one of which it establishes said driving connection and in the other of which it establishes an alternative driving connection to the reel shaft directly from the motor shaft.

12. In a motion picture apparatus, a power shaft, mechanism driven therefrom for propelling film through the apparatus, two reel supports, alternatively operable driving connections from said mechanism to both of said reel supports whereby the reel supports may be driven independently of the film, the driving connection to one reel support including a member movable between two positions, in one of which it establishes said driving connection and in the other of which it establishes an alternative driving connection to the reel shaft directly from the motor shaft, said member being normally spring pressed into the first described position.

13. In a motion picture apparatus, a sprocket shaft, a sprocket on said shaft for propelling film through the apparatus, two reel shafts, driving connections from said sprocket shaft to both of said reel shafts whereby the reel shafts may be driven independently of the film, a power shaft, driving connections from said power shaft to the sprocket shaft, and means for disconnecting one of said reel shafts from the sprocket shaft and connecting it to the power shaft to be driven therefrom.

14. In a motion picture apparatus, a sprocket shaft, a sprocket on said shaft for propelling film through the apparatus, a driving disc on said shaft, a power shaft, driving connection from said power shaft to the sprocket shaft, a driving disc on said power shaft, a film reel shaft, a movable shaft, a disc on said shaft movable therewith into engagement alternatively with one or the other of said driving discs to be driven thereby and a driving connection between said movable shaft and the film reel shaft, whereby the latter may be driven either directly from the power shaft or through the sprocket shaft.

15. In a motion picture apparatus, a sprocket shaft, a sprocket on said shaft for propelling film through the apparatus, a driving disc on said shaft, a power shaft, driving connections from said power shaft to the sprocket shaft, a driving disc on said power shaft, a film reel shaft, a movable shaft, a disc on said shaft movable therewith into engagement alternatively with one or the other of said driving discs to be driven thereby and a driving connection between said movable shaft and the film reel shaft, whereby the latter may be driven either directly from the power shaft or through the sprocket shaft, said movable shaft being normally spring pressed into the position whereat the disc thereon engages the disc on the sprocket shaft.

Signed at Rochester, New York, this 16th day of June, 1927.

NEWTON B. GREEN.